(12) United States Patent
Qian

(10) Patent No.: US 10,375,703 B2
(45) Date of Patent: Aug. 6, 2019

(54) RESOURCE ALLOCATION APPARATUS, SYSTEM AND METHOD

(71) Applicant: Huawei Technologies Co., Ltd., Shenzhen (CN)

(72) Inventor: Tao Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 15/495,658

(22) Filed: Apr. 24, 2017

(65) Prior Publication Data

US 2017/0230987 A1 Aug. 10, 2017

Related U.S. Application Data

(63) Continuation of application No. PCT/CN2015/078954, filed on May 14, 2015.

(30) Foreign Application Priority Data

Oct. 24, 2014 (CN) .......................... 2014 1 0579374

(51) Int. Cl.
*H04W 72/08* (2009.01)
*H04W 72/04* (2009.01)
*H04L 12/26* (2006.01)

(52) U.S. Cl.
CPC ....... *H04W 72/085* (2013.01); *H04L 43/0829* (2013.01); *H04L 43/0847* (2013.01); *H04L 43/16* (2013.01); *H04W 72/04* (2013.01); *H04W 72/048* (2013.01); *H04W 72/082* (2013.01); *H04W 72/044* (2013.01)

(58) Field of Classification Search
CPC .............................. H04W 4/00; H04L 5/0048
USPC ................................................... 370/208–342
See application file for complete search history.

(56) References Cited

U.S. PATENT DOCUMENTS

2005/0208424 A1    9/2005    Hasegawa et al.
2010/0067479 A1    3/2010    Choi et al.
2011/0039568 A1    2/2011    Zhang et al.
(Continued)

FOREIGN PATENT DOCUMENTS

CN        101355788 A        1/2009
CN        101562888 A        10/2009
(Continued)

*Primary Examiner* — Iqbal Zaidi
(74) *Attorney, Agent, or Firm* — Slater Matsil, LLP

(57) ABSTRACT

Embodiments of the present invention disclose a resource allocation apparatus. The apparatus includes: a determining unit, configured to determine a quantity of resource blocks required by user equipment that needs to perform uplink transmission, where a quantity of resource blocks required by first user equipment that needs to perform uplink transmission and a quantity of resource blocks required by second user equipment that needs to perform uplink transmission are both M. The apparatus also includes an allocation unit, configured to allocate a resource block in a first subgroup in a first resource group to the first user equipment and allocate a resource block in a second subgroup in the first resource group to the second user equipment, where the first resource group includes multiple subgroups including the first subgroup and the second subgroup, and each subgroup includes M resource blocks.

18 Claims, 3 Drawing Sheets

(56) References Cited

U.S. PATENT DOCUMENTS

| | | | |
|---|---|---|---|
| 2013/0107861 A1* | 5/2013 | Cheng | H04W 72/042 370/331 |
| 2014/0036961 A1 | 2/2014 | Arnott et al. | |
| 2014/0105057 A1* | 4/2014 | Liu | H04L 1/1861 370/252 |
| 2014/0254537 A1* | 9/2014 | Kim | H04W 52/243 370/329 |
| 2015/0382373 A1 | 12/2015 | Tada et al. | |

FOREIGN PATENT DOCUMENTS

| | | | |
|---|---|---|---|
| CN | 101686495 A | 3/2010 | |
| CN | 101827425 A | 9/2010 | |
| CN | 101834692 A | 9/2010 | |
| CN | 101998640 A | 3/2011 | |
| CN | 102215588 A | 10/2011 | |
| CN | 103139924 A | 6/2013 | |
| CN | 103974427 A | 8/2014 | |
| CN | 104363659 A | 2/2015 | |
| EP | 2291042 A1 | 3/2011 | |
| JP | 2012054938 A | 3/2012 | |
| JP | 2014090482 A | 5/2014 | |
| JP | 2014099877 A | 5/2014 | |
| KR | 20080039772 A | 5/2008 | |
| WO | 2008054157 A2 | 5/2008 | |
| WO | 2009154270 A1 | 12/2009 | |
| WO | 2010071500 A1 | 6/2010 | |
| WO | 2014021573 A1 | 2/2014 | |

\* cited by examiner

RESOURCE ALLOCATION APPARATUS, SYSTEM AND METHOD

CROSS-REFERENCE TO RELATED APPLICATIONS

This application is a continuation of International Application No. PCT/CN2015/078954, filed on May 14, 2015, which claims priority to Chinese Patent Application No. 201410579374.3, filed on Oct. 24, 2014. The disclosures of the aforementioned applications are hereby incorporated by reference in their entireties.

TECHNICAL FIELD

The present invention relates to the field of communications technologies, and specifically to a resource allocation apparatus, system and method.

BACKGROUND

In a Long Term Evolution (LTE) system, when wireless communication resources are utilized in a shared resource allocation manner, each transmission needs related control information, and uplink resources are relatively limited. For a real-time service whose data packet size is relatively fixed and arrival time interval satisfies a given rule, a new resource allocation manner, that is, a semi-persistent scheduling technology, is introduced into the LTE system. Simply, semi-persistent scheduling means that during resource transmission of LTE, a base station initially indicates current resource allocation information of user equipment by using a control channel area, and when the user equipment identifies the semi-persistent scheduling, the user equipment stores the current resource allocation information and sends or receives service data on a same time-frequency resource position every fixed period. Therefore, use of the semi-persistent scheduling can make full use of a feature of periodic arrival of the data packet to achieve single authorization and periodic use, so that resources of the control channel area used for allocation indication by the LTE system can be saved effectively. However, a Virtual Multiple Input Multiple Output (VMIMO) technology is a resource reuse scheduling technology, and resolves a problem of limited uplink resources. By means of VMIMO, two or more user equipments are allowed to be virtually bound, and a same time-frequency resource is used to transmit data.

Using a typical Voice over IP (VoIP) service as an example, at present, the semi-persistent scheduling is basically applied to uplink resources supporting VoIP service capacity, an arrival period of a data packet of the VoIP service is 20 ms, that is, VoIP data packets with an interval of 20 ms are scheduled by using a same Modulation and Coding Scheme (MCS) and a same Radio Bear (RB) position. However, after the semi-persistent scheduling is applied to the VoIP, the MCS does not change, but in the VMIMO, due to an effect of interference between different user equipments, if packet error convergence is guaranteed to some extent, the MCS needs to change according to information about paired user equipments; therefore, the current semi-persistent scheduling of the VoIP cannot be compatible with or coordinate with the VMIMO, limiting the capacity of the VoIP.

SUMMARY

Embodiments of the present invention provide a resource allocation apparatus, system and method, so as to resolve a problem of semi-persistent scheduling incompatibility between VMIMO and VoIP, and further increase VoIP capacity.

According to a first aspect of the present invention, a resource allocation apparatus is provided. The apparatus includes a determining unit, configured to determine a quantity of resource blocks required by user equipment that needs to perform uplink transmission, where a quantity of resource blocks required by first user equipment that needs to perform uplink transmission and a quantity of resource blocks required by second user equipment that needs to perform uplink transmission are both M, and M is a positive integer. The apparatus also includes an allocation unit, configured to allocate a resource block in a first subgroup in a first resource group to the first user equipment, and allocate a resource block in a second subgroup in the first resource group to the second user equipment, where the first resource group includes multiple subgroups including the first subgroup and the second subgroup, and each subgroup includes M resource blocks.

With reference to the first aspect, in a first possible implementation manner, the apparatus further includes: a setting unit, configured to set the first resource group and at least one other resource group, where each of the at least one other resource group includes multiple subgroups, the multiple subgroups in each of the at least one other resource group have a same quantity of resource blocks, and a quantity of resource blocks in a subgroup in the first resource group is different from a quantity of resource blocks in a subgroup in the at least one other resource group.

With reference to the first possible implementation manner of the first aspect, in a second possible implementation manner, the apparatus further includes: a selection unit, configured to select the first resource group from the resource groups that are set, where a condition for the selection is that a subgroup in a resource group includes M resource blocks.

With reference to the second possible implementation manner of the first aspect, in a third possible implementation manner, the allocation unit further includes: a first determining subunit, configured to determine that the first user equipment is in an active semi-persistent state; and/or a second determining subunit, configured to determine that the second user equipment is in an active semi-persistent state, where the allocation unit is specifically configured to: when the first determining subunit determines that the first user equipment is in the active semi-persistent state, allocate the resource block in the first subgroup in the first resource group to the first user equipment; and when the second determining subunit determines that the second user equipment is in the active semi-persistent state, allocate the resource block in the second subgroup in the first resource group to the second user equipment.

With reference to any one of the first aspect or the first to the third possible implementation manners of the first aspect, in a fourth possible implementation manner, the allocation unit further includes: a judging subunit, configured to determine whether a quantity of data packets that are of the first user equipment and in which a parse error occurs is greater than a first threshold and/or whether a packet loss rate of the first user equipment is greater than a second threshold, where the packet loss rate is a ratio of a quantity of data packets in which a parse error occurs within a preset time to a total quantity of data packets received within the preset time; and an allocation subunit, configured to: when the judging subunit determines that the quantity of the data packets that are of the first user equipment and in which a parse error occurs is greater than the first threshold and/or the packet loss rate of the first user equipment is greater than the second threshold, allocate a resource block in a first subgroup in a second resource group to the first user equipment, where a quantity of resource blocks in the first subgroup in the second resource group is M plus 1.

With reference to any one of the first aspect or the first to the third possible implementation manners of the first aspect, in a fifth possible implementation manner, the apparatus is a base station.

According to a second aspect of the present invention, a resource allocation system is provided. The system includes the resource allocation apparatus according to any one of the first aspect or the first to the fifth possible implementation manners of the first aspect and user equipment.

According to a third aspect of the present invention, a resource allocation method is provided. The method includes determining a quantity of resource blocks required by user equipment that needs to perform uplink transmission, where a quantity of resource blocks required by first user equipment that needs to perform uplink transmission and a quantity of resource blocks required by second user equipment that needs to perform uplink transmission are both M, and M is a positive integer. The method also includes allocating a resource block in a first subgroup in a first resource group to the first user equipment, and allocating a resource block in a second subgroup in the first resource group to the second user equipment, where the first resource group includes multiple subgroups including the first subgroup and the second subgroup, and each subgroup includes M resource blocks.

With reference to the third aspect, in a first possible implementation manner, before the allocating a resource block in a first subgroup in a first resource group to the first user equipment and allocating a resource block in a second subgroup in the first resource group to the second user equipment, the method further includes: setting the first resource group and at least one other resource group, where each of the at least one other resource group includes multiple subgroups, the multiple subgroups in each of the at least one other resource group have a same quantity of resource blocks, and a quantity of resource blocks in a subgroup in the first resource group is different from a quantity of resource blocks in a subgroup in the at least one other resource group.

With reference to the first possible implementation manner of the third aspect, in a second possible implementation manner, the method further includes: selecting the first resource group from the resource groups that are set, where a condition for the selection is that a subgroup in a resource group includes M resource blocks.

With reference to the second possible implementation manner of the third aspect, in a third possible implementation manner, before the allocating a resource block in a first subgroup in a first resource group to the first user equipment, the method further includes: determining that the first user equipment is in an active semi-persistent state; and/or before the allocating a resource block in a second subgroup in the first resource group to the second user equipment, the method further includes: determining that the second user equipment is in an active semi-persistent state.

With reference to any one of the third aspect or the first to the third possible implementation manners of the third aspect, in a fourth possible implementation manner, the method further includes: if a quantity of data packets that are of the first user equipment and in which a parse error occurs is greater than a first threshold or a packet loss rate of the first user equipment is greater than a second threshold, allocating a resource block in a first subgroup in a second resource group to the first user equipment, where a quantity of resource blocks in the first subgroup in the second resource group is M plus 1, and the packet loss rate is a ratio of a quantity of data packets in which a parse error occurs within a preset time to a total quantity of data packets received within the preset time.

By means of application of the foregoing technical solutions, a quantity of resource blocks required by user equipment that needs to perform uplink transmission is determined by a determining unit first, where a quantity of resource blocks required by first user equipment that needs to perform uplink transmission and a quantity of resource blocks required by second user equipment that needs to perform uplink transmission are both M, and M is a positive integer; then, a resource block in a first subgroup in a first resource group is allocated to the first user equipment by an allocation unit, and a resource block in a second subgroup in the first resource group is allocated to the second user equipment by a first allocation module, where the first resource group includes multiple subgroups including the first subgroup and the second subgroup, and each subgroup includes M resource blocks. Therefore, resource blocks in the multiple subgroups in the first resource group can be allocated to multiple user equipments, so as to resolve a problem of semi-persistent scheduling incompatibility between VMIMO and VoIP in the prior art, and further increase VoIP capacity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present invention provide a resource allocation apparatus, system and method, so as to resolve a problem of semi-persistent scheduling incompatibility between VMIMO and VoIP, and increase VoIP capacity.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

A communications system to which the embodiments of the present invention are applied may be an improvement made based on an LTE communications system or another communications system, and this is not limited herein. It can be understood that the embodiments of the present invention are applicable to an LTE system, another IP-based wireless communications system (that is, another system capable of supporting a VoIP service), and the like. The embodiments of the present invention may be applied when uplink resources are limited. By means of compatibility and coordination between VMIMO and VoIP, a problem of limited uplink resources is resolved, and a problem of a large load of a control channel area is resolved, so that VoIP capacity is increased.

Figure 1:
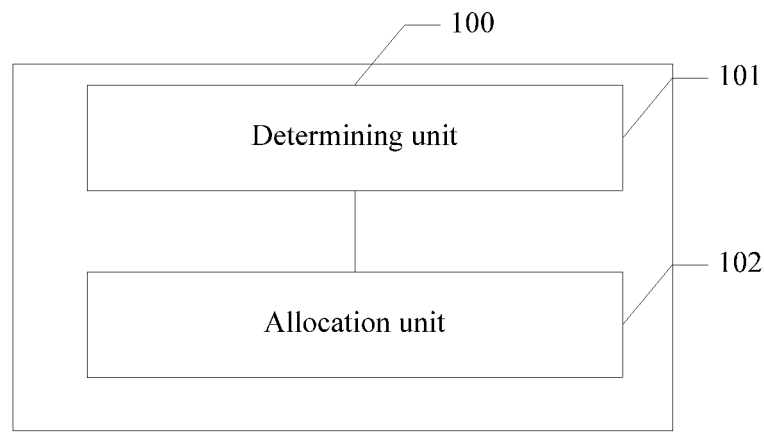
FIG. 1 is a schematic diagram of an embodiment of a resource allocation apparatus according to an embodiment of the present invention.

Referring to FIG. 1, an embodiment of a resource allocation apparatus 100 according to an embodiment of the present invention includes a determining unit 101 and an allocation unit 102.

The determining unit 101 is configured to determine a quantity of resource blocks required by user equipment that needs to perform uplink transmission.

In this embodiment of the present invention, a process of first determining a quantity of resource blocks required by user equipment that needs to perform uplink transmission is: for example, the user equipment performs uplink transmission basically by means of semi-persistent scheduling, and an arrival period of a data packet is 20 ms, that is, if speech coding of G.729 64K is used as an example, a data packet of 20×64=1280 bits is generated within 20 ms; an MCS of the user equipment is estimated according to a channel condition of the user equipment, where the channel condition may be converted into an RB frequency efficiency or the like; then the quantity of the resource blocks required by the user equipment to perform uplink transmission is determined according to the MCS of the user equipment, where a quantity of resource blocks required by first user equipment that needs to perform uplink transmission and a quantity of resource blocks required by second user equipment that needs to perform uplink transmission are both M, and M is a positive integer, that is, one RB, two RBs, three RBs, or the like; and a quantity of RB resource blocks included in the uplink transmission can be further determined, that is, a quantity of RB resource blocks of one RB, a quantity of RB resource blocks of two RBs, a quantity of RB resource blocks of three RBs, or the like.

It should be noted that, in this embodiment of the present invention, resources for performing uplink transmission may be a VoIP data packet or another data packet, and this is not specifically limited herein.

It should be noted that the resource blocks may be RB resource blocks or other resource blocks, and this is not specifically limited herein.

The allocation unit 102 is configured to: after the determining unit 101 determines the quantity of the resource blocks required by the user equipment that needs to perform uplink transmission, allocate a resource block in a first subgroup in a first resource group to first user equipment, and allocate a resource block in a second subgroup in the first resource group to the second user equipment, where the first resource group includes multiple subgroups including the first subgroup and the second subgroup, and each subgroup includes M resource blocks.

In this embodiment of the present invention, furthermore, a base station allocates resource blocks in different subgroups in a same resource group to at least two user equipments. For example, if the quantity of the resource blocks required by the first user equipment that needs to perform uplink transmission and the quantity of the resource blocks required by the second user equipment that needs to perform uplink transmission are both 2, and actually, the quantity of the resource blocks is physical, two resource blocks in the first subgroup are allocated to the first user equipment, and two resource blocks in the second subgroup are allocated to the second user equipment. Actually, each resource group includes multiple subgroups having a same quantity of resource blocks, for example, may be an RB resource group of one RB or an RB resource group of two RBs, where the RB resource group of one RB includes multiple subgroups that each have one RB, and the RB resource group of two RBs includes multiple subgroups that each have two RBs.

According to this embodiment of the present invention, a quantity of resource blocks required by user equipment that needs to perform uplink transmission is determined by a determining unit first, where a quantity of resource blocks required by first user equipment that needs to perform uplink transmission and a quantity of resource blocks required by second user equipment that needs to perform uplink transmission are both M, and M is a positive integer; then, a resource block in a first subgroup in a first resource group is allocated to the first user equipment and a resource block in a second subgroup in the first resource group is allocated to the second user equipment by an allocation unit, where the first resource group includes multiple subgroups including the first subgroup and the second subgroup, and each subgroup includes M resource blocks. Therefore, resource blocks in the multiple subgroups in the first resource group can be allocated to multiple user equipments, so as to resolve a problem of semi-persistent scheduling incompatibility between VMIMO and VoIP in the prior art, thereby increasing VoIP capacity.

Figure 2:
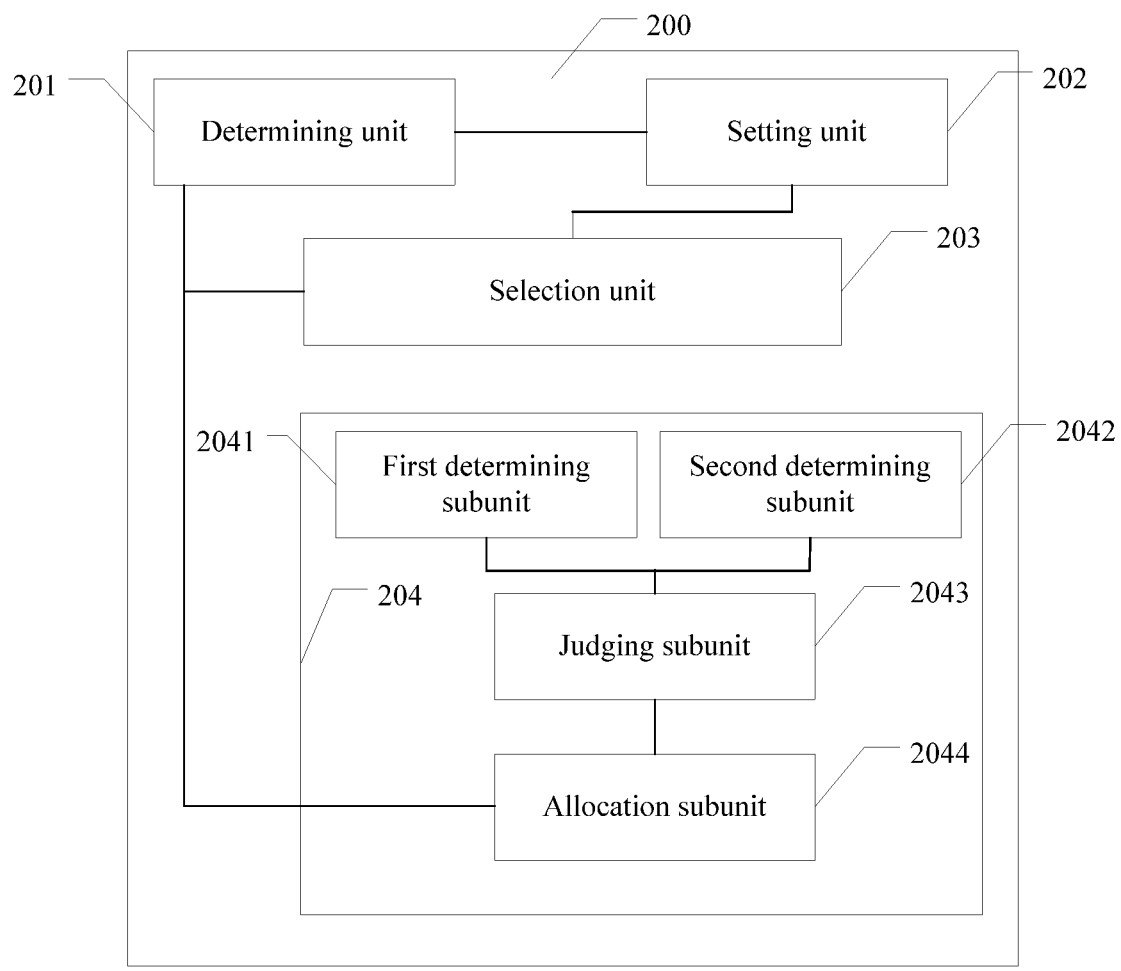
FIG. 2 is a schematic diagram of another embodiment of a resource allocation apparatus according to an embodiment of the present invention.

Referring to FIG. 2, an embodiment of a resource allocation apparatus 200 according to an embodiment of the present invention includes a determining unit 201, a setting unit 202, a selection unit 203, and an allocation unit 204.

The determining unit 201 is configured to determine a quantity of resource blocks required by user equipment that needs to perform uplink transmission.

In this embodiment of the present invention, a process of first determining a quantity of resource blocks required by user equipment that needs to perform uplink transmission is: an MCS of the user equipment may be first estimated according to a channel condition of the user equipment, where the channel condition may be converted into an RB frequency efficiency or the like; then the quantity of the resource blocks required by the user equipment to perform uplink transmission is determined according to the MCS of the user equipment, where a quantity of resource blocks required by first user equipment that needs to perform uplink transmission and a quantity of resource blocks required by second user equipment that needs to perform uplink transmission are both M, and M is a positive integer.

The setting unit 202 is configured to: after the determining unit 201 determines the quantity of the resource blocks required by the user equipment that needs to perform uplink transmission, set a first resource group and at least one other resource group, where each of the at least one other resource group includes multiple subgroups, the multiple subgroups in each of the at least one other resource group have a same quantity of resource blocks, and a quantity of resource blocks in a subgroup in the first resource group is different from a quantity of resource blocks in a subgroup in the at least one other resource group.

Furthermore, resource groups need to be set in this embodiment of the present invention. By setting the resource groups, resource blocks in multiple subgroups in each resource group are separately allocated to multiple user equipments, so as to resolve a problem of incompatibility in the prior art, and increase VoIP capacity.

The selection unit 203 is configured to: after the setting unit 202 sets the first resource group and the at least one other resource group, select the first resource group from the resource groups that are set, where a condition for the selection is that a subgroup in a resource group includes M resource blocks.

Furthermore, because different resource groups on a base station side have different quantities of resource blocks, a corresponding resource group is selected according to the quantity of the resource blocks required by the first user equipment to perform uplink transmission and the quantity of the resource blocks required by the second user equipment to perform uplink transmission.

The allocation unit 204 includes: a first determining subunit 2041 and/or a second determining subunit 2042. The first determining subunit 2041 is configured to determine that the first user equipment is in an active semi-persistent state; and the second determining subunit 2042 is configured to determine that the second user equipment is in an active semi-persistent state.

Furthermore, only user equipment that is in the active semi-persistent state can perform uplink transmission. Therefore, if user equipment is not in the active semi-persistent state, a corresponding resource group further needs to be selected according to a quantity of resource blocks required by the user equipment.

The allocation unit 204 is specifically configured to: after the selection unit 203 selects the first resource group from the resource groups that are set, when the first determining subunit 2041 determines that the first user equipment is in the active semi-persistent state, allocate a resource block in a first subgroup in the first resource group to the first user equipment; and when the second determining subunit 2042 determines that the second user equipment is in the active semi-persistent state, allocate a resource block in a second subgroup in the first resource group to the second user equipment.

Furthermore, the allocating a resource block in a first subgroup in the first resource group to the first user equipment and allocating a resource block in a second subgroup in the first resource group to the second user equipment may be understood as paired allocation of resources for the user equipments. That is, resource blocks in a same resource group are allocated to at least two user equipments, that is, the first user equipment and the second user equipment obtain a same size of resource blocks, and paired allocation of resources is completed, so that a problem of incompatibility in the prior art is resolved, and service capacity can be increased. For example, an increase in the capacity lies in space division multiplexing, 100 RBs are allocated to the first user equipment, and 100 RBs are allocated to the second user equipment, so that 200 RBs are formed and the capacity is naturally increased.

It should be noted that, in some embodiments, the allocation unit 204 may further include: a judging subunit 2043 and an allocation subunit 2044.

The judging subunit 2043 is configured to determine whether a quantity of data packets that are of the first user equipment and in which a parse error occurs is greater than a first threshold and/or whether a packet loss rate of the first user equipment is greater than a second threshold, where the packet loss rate is a ratio of a quantity of data packets in which a parse error occurs within a preset time to a total quantity of data packets received within the preset time.

The allocation subunit 2044 is configured to: when the judging subunit determines that the quantity of the data packets that are of the first user equipment and in which a parse error occurs is greater than the first threshold and/or the packet loss rate of the first user equipment is greater than the second threshold, allocate a resource block in a first subgroup in a second resource group to the first user equipment, where a quantity of resource blocks in the first subgroup in the second resource group is M plus 1.

In this embodiment of the present invention, if the quantity of the data packets that are of the first user equipment and in which a parse error occurs is greater than the first threshold or the packet loss rate of the first user equipment is greater than the second threshold, the quantity of the resource blocks required by the first user equipment is increased by 1. For example, if the previously determined quantity of the resource blocks of the first user equipment is 1, one resource block in a subgroup in a resource group of one resource block is allocated to the first user equipment, then the quantity of the resource blocks of the first user equipment is revised into 2, and two resource blocks in a subgroup in a resource group of two resource blocks are allocated to the first user equipment. The packet loss rate is a ratio of a quantity of data packets in which a parse error occurs within a preset time to a total quantity of data packets received within the preset time, for example, a ratio of a quantity of data packets in which a parse error occurs within one second to a total quantity of data packets received within one second.

It should be noted that if a quantity of data packets that are of the second user equipment and in which a parse error occurs is greater than the first threshold and/or a packet loss rate of the second user equipment is greater than the second threshold, a resource block in a second subgroup in the second resource group is allocated to the second user equipment, and a quantity of resource blocks in the second subgroup in the second resource group is M plus 1. This is not specifically limited herein.

It should be noted that, except allocation of resources to the first user equipment and the second user equipment, when resources are allocated subsequently, because a behavior of scheduling in a control channel area is not triggered, the resources only need to be allocated on a same time frequency.

It should be noted that the resource allocation apparatus is a base station.

In this embodiment of the present invention, a quantity of resource blocks required by user equipment that needs to perform uplink transmission is determined by a determining unit first; on a corresponding base station side, a first resource group and at least one other resource group are set by a setting unit, and then the first resource group is selected by a selection unit from the resource groups that are set, that is, a resource group whose subgroup includes M resource blocks is selected; and furthermore, after it is determined that first user equipment is in an active semi-persistent state, a resource block in a first subgroup in the first resource group is allocated to the first user equipment by an allocation unit, and after second user equipment is in an active semi-persistent state, a resource block in a second subgroup in the first resource group is allocated to the second user equipment, where the first resource group includes multiple subgroups including the first subgroup and the second subgroup, and each subgroup includes M resource blocks. Therefore, resource blocks in the multiple subgroups in the first resource group can be allocated to multiple user equipments, so as to resolve a problem of semi-persistent scheduling incompatibility between VMIMO and VoIP in the prior art, thereby increasing VoIP capacity.

The embodiments of the present invention further provide a resource allocation system, including the foregoing resource allocation apparatus and user equipment. For a specific embodiment, refer to the embodiment of the foregoing resource allocation apparatus, and details are not described herein.

The embodiments shown in FIG. 1 and FIG. 2 describe a specific structure of the resource allocation apparatus from the aspect of function module. A specific structure of a resource allocation apparatus is described below from the aspect of hardware with reference to the embodiment in FIG. 3.

Figure 3:
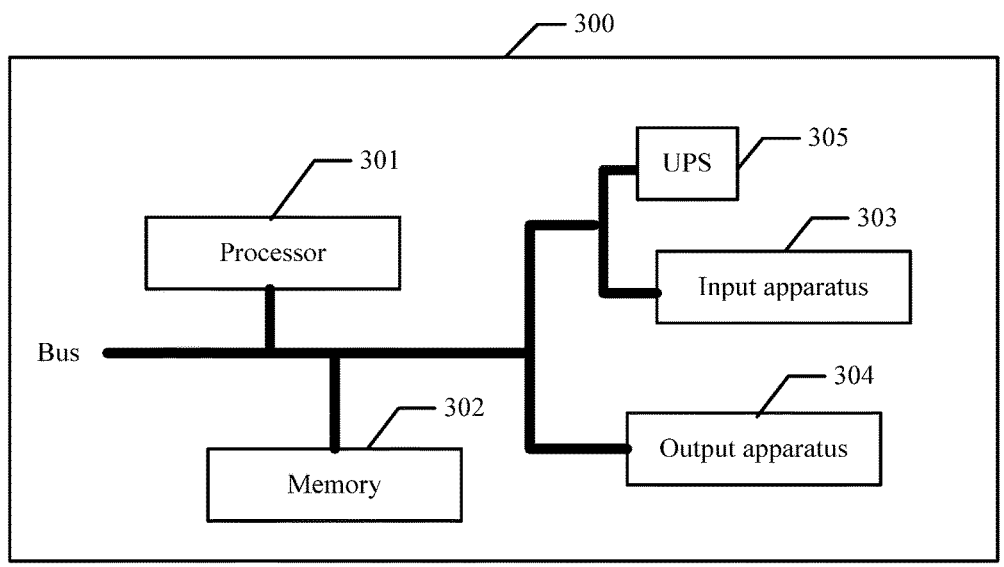
FIG. 3 is a schematic structural diagram of a resource allocation apparatus according to an embodiment of the present invention.

Referring to FIG. 3, FIG. 3 is a schematic structural diagram of a resource allocation apparatus 300 according to an embodiment of the present invention, where the resource allocation apparatus 300 may include at least one processor 301 (for example, CPU, Central Processing Unit), at least one network interface or another communications interface, a memory 302, at least one communications bus, at least one input apparatus 303, at least one output apparatus 304, and an uninterruptible power supply UPS 305 that is configured to implement connection and communication between these apparatuses. The processor 301 is configured to execute an executable module, such as a computer program, stored in the memory 302. The memory 302 may include a high-speed random access memory (RAM), and may further include a non-volatile memory, for example, at least one magnetic disk memory. Communication connection between a system gateway and at least one other network element is implemented by using the at least one network interface (which may be wired or wireless), and the Internet, a wide area network, a local network, a metropolitan area network, and the like may be used.

As shown in FIG. 3, in some implementation manners, the memory 302 stores a program instruction, the program instruction may be executed by the processor 301, and the processor 301 specifically performs the following steps: determining a quantity of resource blocks required by user equipment that needs to perform uplink transmission; and allocating a resource block in a first subgroup in a first resource group to first user equipment, and allocating a resource block in a second subgroup in the first resource group to second user equipment, where the first resource group includes multiple subgroups including the first subgroup and the second subgroup, and each subgroup includes M resource blocks.

In some implementation manners, the processor 301 may further perform the following step: setting the first resource group and at least one other resource group, where each of the at least one other resource group includes multiple subgroups, the multiple subgroups in each of the at least one other resource group have a same quantity of resource blocks, and a quantity of resource blocks in a subgroup in the first resource group is different from a quantity of resource blocks in a subgroup in the at least one other resource group.

In some implementation manners, the processor 301 may further perform the following step: selecting the first resource group from the resource groups that are set, where a condition for the selection is that a subgroup in a resource group includes M resource blocks.

In some implementation manners, the processor 301 may further perform the following steps: determining that the first user equipment is in an active semi-persistent state; and/or determining that the second user equipment is in an active semi-persistent state.

In some implementation manners, the processor 301 may further perform the following steps: determining whether an accumulated quantity of packet errors of the first user equipment is greater than a threshold; and if a quantity of data packets that are of the first user equipment and in which a parse error occurs is greater than a first threshold or a packet loss rate of the first user equipment is greater than a second threshold, allocating a resource block in a first subgroup in a second resource group to the first user equipment, where a quantity of resource blocks in the first subgroup in the second resource group is M plus 1, and the packet loss rate is a ratio of a quantity of data packets in which a parse error occurs within a preset time to a total quantity of data packets received within the preset time.

Figure 4:
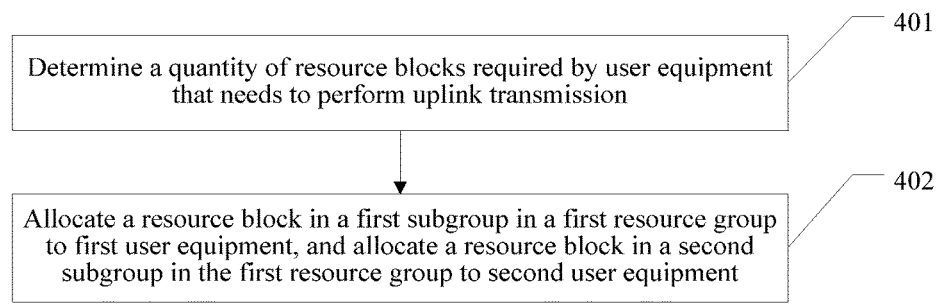
FIG. 4 is a schematic diagram of an embodiment of a resource allocation method according to an embodiment of the present invention.

The embodiments of the resource allocation apparatus are described above, and an embodiment of a resource allocation method is further described below. Referring to FIG. 4, an embodiment of a resource allocation method according to an embodiment of the present invention includes: step 401 and step 402.

401: Determine a quantity of resource blocks required by user equipment that needs to perform uplink transmission.

In this embodiment of the present invention, a process of determining a quantity of resource blocks required by user equipment that needs to perform uplink transmission is: for example, the user equipment performs uplink transmission basically by means of semi-persistent scheduling, and an arrival period of a data packet is 20 ms, that is, if speech coding of G.729 64K is used as an example, a data packet of 20×64=1280 bits is generated within 20 ms; an MCS of the user equipment is estimated according to a channel condition of the user equipment, where the channel condition may be converted into an RB frequency efficiency or the like; then the quantity of the resource blocks required by the user equipment to perform uplink transmission is determined according to the MCS of the user equipment, where a quantity of resource blocks required by first user equipment that needs to perform uplink transmission and a quantity of resource blocks required by second user equipment that needs to perform uplink transmission are both M, and M is a positive integer, that is, one RB, two RBs, three RBs, or the like; and a quantity of RB resource blocks included in the uplink transmission can be further determined, that is, a quantity of RB resource blocks of one RB, a quantity of RB resource blocks of two RBs, a quantity of RB resource blocks of three RBs, or the like.

It should be noted that, in this embodiment of the present invention, resources for performing uplink transmission may be VoIP speech data or another data, and this is not specifically limited herein.

It should be noted that the resource blocks may be RB resource blocks or other resource blocks, and this is not specifically limited herein.

402: Allocate a resource block in a first subgroup in a first resource group to first user equipment, and allocate a resource block in a second subgroup in the first resource group to second user equipment.

In this embodiment of the present invention, the first resource group includes multiple subgroups including the first subgroup and the second subgroup, and each subgroup includes M resource blocks. Furthermore, a base station allocates resource blocks in different subgroups in a same resource group to at least two user equipments. For example, if the quantity of the resource blocks required by the first user equipment that needs to perform uplink transmission and the quantity of the resource blocks required by the second user equipment that needs to perform uplink transmission are both 2, two resource blocks in the first subgroup and two resource blocks in the second subgroup are allocated to the first user equipment and the second user equipment respectively. Actually, each resource group includes multiple subgroups having a same quantity of resource blocks, for example, may be an RB resource group of one RB or an RB resource group of two RBs, where the RB resource group of one RB includes multiple subgroups that each have one RB, and the RB resource group of two RBs includes multiple subgroups that each have two RBs.

According to this embodiment of the present invention, after a quantity of resource blocks required by user equipment that needs to perform uplink transmission is determined first, where a quantity of resource blocks required by first user equipment that needs to perform uplink transmission and a quantity of resource blocks required by second user equipment that needs to perform uplink transmission are both M, and M is a positive integer, a resource block in a first subgroup in a first resource group is allocated to the first user equipment and a resource block in a second subgroup in the first resource group is allocated to the second user equipment, where the first resource group includes multiple subgroups including the first subgroup and the second subgroup, and each subgroup includes M resource blocks. Therefore, resource blocks in the multiple subgroups in the first resource group can be allocated to multiple user equipments, so as to resolve a problem of semi-persistent scheduling incompatibility between VMIMO and VoIP in the prior art, thereby increasing VoIP capacity.

Figure 5:
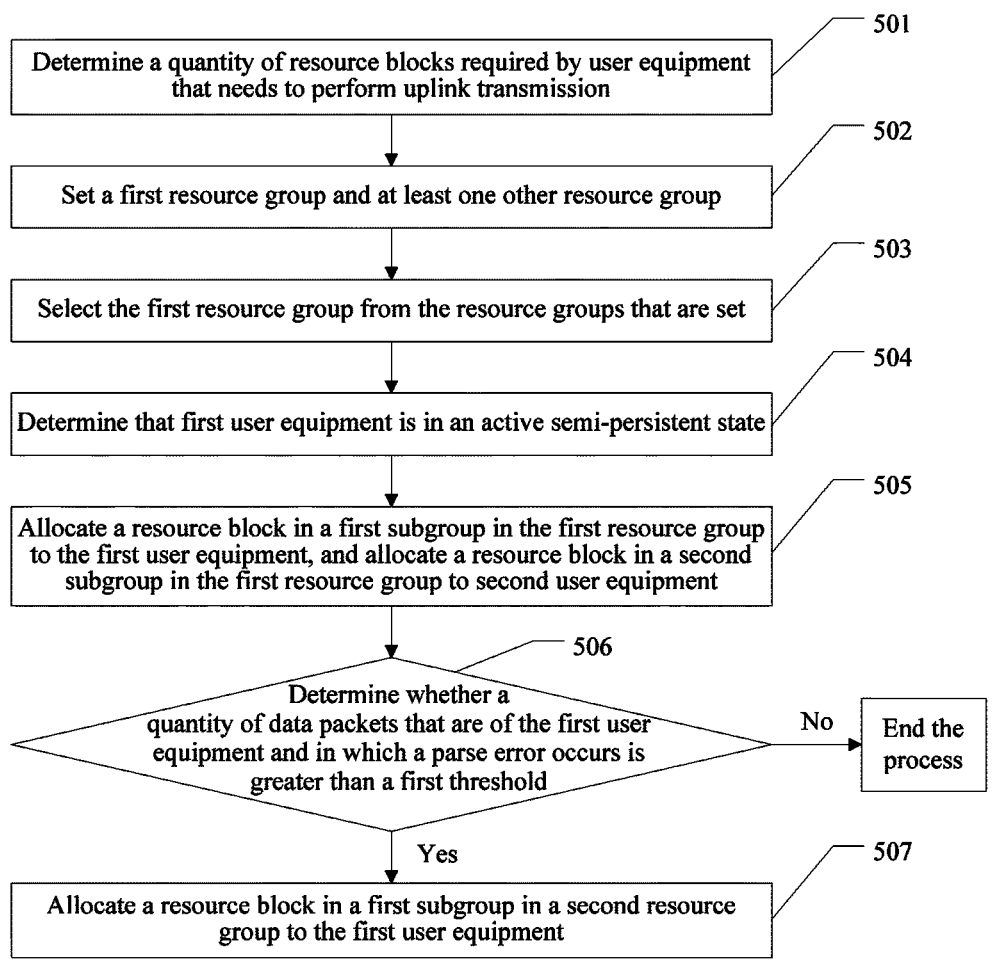
FIG. 5 is a schematic diagram of another embodiment of a resource allocation method according to an embodiment of the present invention.

Referring to FIG. 5, an embodiment of a specific application scenario of a resource allocation method according to an embodiment of the present invention includes: step 501 to step 507.

501: Determine a quantity of resource blocks required by user equipment that needs to perform uplink transmission.

In this embodiment of the present invention, the determining a quantity of resource blocks required by user equipment that needs to perform uplink transmission is: an MCS of the user equipment may be first estimated according to a channel condition of the user equipment, and the channel condition may be converted into an RB frequency efficiency or the like; then the quantity of the resource blocks required by the user equipment to perform uplink transmission is determined according to the MCS of the user equipment, where a quantity of resource blocks required by first user equipment that needs to perform uplink transmission and a quantity of resource blocks required by second user equipment that needs to perform uplink transmission are both M, and M is a positive integer.

502: Set a first resource group and at least one other resource group.

In this embodiment of the present invention, each of the at least one other resource group includes multiple subgroups, the multiple subgroups in each of the at least one other resource group have a same quantity of resource blocks, and a quantity of resource blocks in a subgroup in the first resource group is different from a quantity of resource blocks in a subgroup in the at least one other resource group.

Furthermore, resource groups need to be set in this embodiment of the present invention. By setting the resource groups, resource blocks in multiple subgroups in each resource group are separately allocated to multiple user equipments, so as to resolve a problem of incompatibility in the prior art, and increase VoIP capacity.

503: Select the first resource group from the resource groups that are set.

In this embodiment of the present invention, a condition for the selection is that a subgroup in a resource group includes M resource blocks.

Furthermore, because different resource groups on a base station side have different quantities of resource blocks, a corresponding resource group is selected according to the quantity of the resource blocks required by the first user equipment to perform uplink transmission and the quantity of the resource blocks required by the second user equipment to perform uplink transmission.

504: Determine that first user equipment is in an active semi-persistent state.

In this embodiment of the present invention, only user equipment that is in the active semi-persistent state can perform uplink transmission. Therefore, if user equipment is not in the active semi-persistent state, a corresponding resource group further needs to be selected according to a quantity of resource blocks required by the user equipment.

505: Allocate a resource block in a first subgroup in the first resource group to the first user equipment, and allocate a resource block in a second subgroup in the first resource group to second user equipment.

In this embodiment of the present invention, the allocating a resource block in a first subgroup in the first resource group to the first user equipment and allocating a resource block in a second subgroup in the first resource group to second user equipment may be understood as paired allocation of resources for the user equipments, where the first resource group includes multiple subgroups including the first subgroup and the second subgroup, and each subgroup includes M resource blocks. That is, resource blocks in a same resource group are allocated to at least two user equipments, that is, the first user equipment and the second user equipment obtain a same size of resource blocks, and paired allocation of resources is completed, so that a problem of incompatibility in the prior art is resolved, and service capacity can be increased. For example, an increase in the capacity lies in space division multiplexing, 100 RBs are allocated to the first user equipment, and 100 RBs are allocated to the second user equipment, so that 200 RBs are formed and the capacity is naturally increased.

It should be noted that before the resource block in the second subgroup in the first resource group is allocated to the second user equipment, it needs to be determined that the second user equipment is in the active semi-persistent state.

506: Determine whether a quantity of data packets that are of the first user equipment and in which a parse error occurs is greater than a first threshold; if yes, perform step 507.

Optionally, if a packet loss rate of the first user equipment is greater than a second threshold, step 507 is also performed.

It may be understood that the packet loss rate is a ratio of a quantity of data packets in which a parse error occurs within a preset time to a total quantity of data packets received within the preset time. For example, a ratio of a quantity of data packets in which a parse error occurs within one second to a total quantity of data packets received within one second is greater than the second threshold, step 507 is performed.

507: Allocate a resource block in a first subgroup in a second resource group to the first user equipment.

In this embodiment of the present invention, if the quantity of the data packets that are of the first user equipment and in which a parse error occurs is greater than the first threshold or the packet loss rate of the first user equipment is greater than the second threshold, the quantity of the resource blocks required by the first user equipment is increased by 1. For example, if the previously determined quantity of the resource blocks of the first user equipment is 1, when resources are allocated, one resource block in a subgroup in a resource group of one resource block is allocated to the first user equipment, then the quantity of the resource blocks of the first user equipment is revised into 2, and two resource blocks in a subgroup in a resource group of two resource blocks are allocated to the first user equipment.

It should be noted that if a quantity of data packets that are of the second user equipment and in which a parse error occurs is greater than the first threshold and/or a packet loss rate of the second user equipment is greater than the second threshold, a resource block in a second subgroup in the second resource group is allocated to the second user equipment, and a quantity of resource blocks in the second subgroup in the second resource group is M plus 1. This is not specifically limited herein.

In this embodiment of the present invention, a quantity of resource blocks required by user equipment that needs to perform uplink transmission is determined first; on a corresponding base station side, a first resource group and at least one other resource group are set, and then the first resource group is selected from the resource groups that are set, that is, a resource group whose subgroup includes M resource blocks is selected; and furthermore, after it is determined that first user equipment is in an active semi-persistent state, a resource block in a first subgroup in the first resource group is allocated to the first user equipment, and after second user equipment is in an active semi-persistent state, a resource block in a second subgroup in the first resource group is allocated to the second user equipment, where the first resource group includes multiple subgroups including the first subgroup and the second subgroup, and each subgroup includes M resource blocks. Therefore, resource blocks in the multiple subgroups in the first resource group can be allocated to multiple user equipments, so as to resolve a problem of semi-persistent scheduling incompatibility between VMIMO and VoIP in the prior art, thereby increasing VoIP capacity.

To sum up, according to the embodiments of the present invention, a quantity of resource blocks required by user equipment that needs to perform uplink transmission is determined by a determining unit, where a quantity of resource blocks required by first user equipment that needs to perform uplink transmission and a quantity of resource blocks required by second user equipment that needs to perform uplink transmission are both M, and M is a positive integer; then, a resource block in a first subgroup in a first resource group is allocated to the first user equipment and a resource block in a second subgroup in the first resource group is allocated to the second user equipment by an allocation unit, where the first resource group includes multiple subgroups including the first subgroup and the second subgroup, and each subgroup includes M resource blocks. Therefore, resource blocks in the multiple subgroups in the first resource group can be allocated to multiple user equipments, so as to resolve a problem of semi-persistent scheduling incompatibility between VMIMO and VoIP in the prior art, thereby increasing VoIP capacity.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An apparatus, comprising:
   a processor; and
   a non-transitory computer-readable storage medium storing a program to be executed by the processor, the program including instructions for:
   determining quantities of resource blocks required by a plurality of user equipment that need to perform uplink transmissions, wherein a first quantity of resource blocks required by a first user equipment to perform a first uplink transmission and a second quantity of resource blocks required by a second user equipment to perform a second uplink transmission are both M, and M is a positive integer;
   selecting a first resource group from a plurality of resource groups, wherein a condition for the selection is that a subgroup in the selected first resource group comprises M resource blocks; and
   allocating M resource blocks in a first subgroup in the first resource group to the first user equipment, and allocating M resource blocks in a second subgroup in the first resource group to the second user equipment, wherein the first resource group comprises a first plurality of subgroups comprising the first subgroup and the second subgroup.

2. The apparatus according to claim 1, wherein the program further includes instructions for:
   setting the first resource group and at least one other resource group, wherein each of the at least one other resource group comprises a plurality of subgroups, the plurality of subgroups in each of the at least one other resource group have a same quantity of resource blocks, and the first quantity of resource blocks in a subgroup in the first resource group is different from a third quantity of resource blocks in a subgroup in the at least one other resource group.

3. The apparatus according to claim 1, wherein allocating the M resource blocks in the first subgroup in the first resource group to the first user equipment comprises:
   determining whether the first user equipment is in an active semi-persistent state; and
   in response to determining that the first user equipment is in the active semi-persistent state, allocating the M resource blocks in the first subgroup in the first resource group to the first user equipment.

4. The apparatus according to claim 1, wherein the program further includes instructions for:
   determining whether a parse error count of the first user equipment exceeds a first threshold; and
   in response to determining that the parse error count occurs exceeds the first threshold, allocating a third subgroup in a second resource group to the first user equipment, wherein a third quantity of resource blocks in the third subgroup in the second resource group is M plus 1.

5. The apparatus according to claim 1, wherein the apparatus is a base station.

6. A resource allocation system, comprising:
   the apparatus according to claim 1; and
   user equipment.

7. The apparatus according to claim 1, wherein allocating the M resource blocks in the second subgroup in the first resource group to the second user equipment comprises:
   determining whether the second user equipment is in an active semi-persistent state; and
   in response to determining that the second user equipment is in the active semi-persistent state, allocating the M resource blocks in the second subgroup in the first resource group to the second user equipment.

8. The apparatus according to claim 1, wherein the program further includes instructions for:
   determining whether a packet loss rate of the first user equipment exceeds a second threshold, wherein the packet loss rate is a ratio of a quantity of data packets in which a parse error occurs within a preset time to a total quantity of data packets received within the preset time; and
   in response to determining that the packet loss rate of the first user equipment exceeds the second threshold, allocating a third subgroup in a second resource group to the first user equipment, wherein a third quantity of resource blocks in the third subgroup in the second resource group is M plus 1.

9. A method, comprising:
   determining quantities of resource blocks required by a plurality of user equipment that need to perform uplink transmissions, wherein a first quantity of resource blocks required by a first user equipment to perform a first uplink transmission and a second quantity of resource blocks required by a second user equipment to perform a second uplink transmission are both M, and M is a positive integer;
   selecting a first resource group from a plurality of resource groups, wherein a condition for the selection is that a subgroup in the first resource group comprises M resource blocks; and
   allocating M resource blocks in a first subgroup in the first resource group to the first user equipment, and allocating M resource blocks in a second subgroup in the first resource group to the second user equipment, wherein the first resource group comprises a first plurality of subgroups comprising the first subgroup and the second subgroup.

10. The method according to claim 9, further comprising:
    setting the first resource group and at least one other resource group, wherein each of the at least one other resource group comprises a plurality of subgroups, the plurality of subgroups in each of the at least one other resource group have a same quantity of resource blocks, and the first quantity of resource blocks in a subgroup in the first resource group is different from a third quantity of resource blocks in a subgroup in the at least one other resource group.

11. The method according to claim 10, wherein:
    before allocating the M resource blocks in the first subgroup in the first resource group to the first user equipment, the method further comprises: determining that the first user equipment is in an active semi-persistent state; and
    before allocating the M resource blocks in the second subgroup in the first resource group to the second user equipment, the method further comprises: determining that the second user equipment is in the active semi-persistent state.

12. The method according to claim 9, further comprising:
in response to determining that a quantity of data packets that are of the first user equipment and in which a parse error occurs is greater than a first threshold, allocating a third subgroup in a second resource group to the first user equipment, wherein a third quantity of resource blocks in the third subgroup in the second resource group is M plus 1.

13. The method according to claim 9, further comprising:
in response to determining that a packet loss rate of the first user equipment is greater than a second threshold, allocating a third subgroup in a second resource group to the first user equipment, wherein a third quantity of resource blocks in the third subgroup in the second resource group is M plus 1, and the packet loss rate is a ratio of a quantity of data packets in which a parse error occurs within a preset time to a total quantity of data packets received within the preset time.

14. A non-transitory computer-readable media storing computer instructions that are configured to, when executed by one or more processors of an apparatus, cause the one or more processors to perform operations comprising:
determining quantities of resource blocks required by a plurality of user equipment that need to perform uplink transmissions, wherein a first quantity of resource blocks required by a first user equipment to perform a first uplink transmission and a second quantity of resource blocks required by a second user equipment to perform a second uplink transmission are both M, and M is a positive integer;
selecting a first resource group from a plurality of resource groups, wherein a condition for the selection is that a subgroup in the first resource group comprises M resource blocks; and
allocating M resource blocks in a first subgroup in the first resource group to the first user equipment, and allocating M resource blocks in a second subgroup in the first resource group to the second user equipment, wherein the first resource group comprises a first plurality of subgroups comprising the first subgroup and the second subgroup.

15. The non-transitory computer-readable media according to claim 14, wherein the operations further comprise:
setting the first resource group and at least one other resource group, wherein each of the at least one other resource group comprises a plurality of subgroups, the plurality of subgroups in each of the at least one other resource group have a same quantity of resource blocks, and the first quantity of resource blocks in a subgroup in the first resource group is different from a third quantity of resource blocks in a subgroup in the at least one other resource group.

16. The non-transitory computer-readable media according to claim 14, wherein:
allocating the M resource blocks in the first subgroup in the first resource group to the first user equipment comprises:
determining that the first user equipment is in an active semi-persistent state; and
in response to determining that the first user equipment is in the active semi-persistent state, allocating the M resource blocks in the first subgroup in the first resource group to the first user equipment; and
allocating the M resource blocks in the second subgroup in the first resource group to the second user equipment comprises:
determining that the second user equipment is in the active semi-persistent state; and
in response to determining that the second user equipment is in the active semi-persistent state, allocating the M resource blocks in the second subgroup in the first resource group to the second user equipment.

17. The non-transitory computer-readable media according to claim 14, wherein the operations further comprise:
in response to determining that a quantity of data packets that are of the first user equipment and in which a parse error occurs is greater than a first threshold, allocating a third subgroup in a second resource group to the first user equipment, wherein a third quantity of resource blocks in the third subgroup in the second resource group is M plus 1.

18. The non-transitory computer-readable media according to claim 14, wherein the operations further comprise:
in response to determining that a packet loss rate of the first user equipment is greater than a second threshold, allocating a third subgroup in a second resource group to the first user equipment, wherein a third quantity of resource blocks in the third subgroup in the second resource group is M plus 1, and the packet loss rate is a ratio of a quantity of data packets in which a parse error occurs within a preset time to a total quantity of data packets received within the preset time.

* * * * *